(12) United States Patent
Semrau

(10) Patent No.: US 12,502,813 B2
(45) Date of Patent: Dec. 23, 2025

(54) ROLLING ASSEMBLY

(71) Applicant: Carl Freudenberg KG, Weinheim (DE)

(72) Inventor: Marek Semrau, Bestensee (DE)

(73) Assignee: CARL FREUDENBERG KG, Weinheim (DE)

( * ) Notice: Subject to any disclaimer, the term of this patent is extended or adjusted under 35 U.S.C. 154(b) by 116 days.

(21) Appl. No.: 18/635,057

(22) Filed: Apr. 15, 2024

(65) Prior Publication Data

US 2024/0351246 A1 Oct. 24, 2024

(30) Foreign Application Priority Data

Apr. 20, 2023 (DE) ............ 10 2023 110 088.2

(51) Int. Cl.
| | |
|---|---|
| *B29C 43/58* | (2006.01) |
| *B29B 7/56* | (2006.01) |
| *B29B 7/72* | (2006.01) |
| *F15B 19/00* | (2006.01) |
| *F15B 1/24* | (2006.01) |

(52) U.S. Cl.
CPC ............. *B29C 43/58* (2013.01); *B29B 7/56* (2013.01); *B29B 7/722* (2013.01); *F15B 19/005* (2013.01); *B29C 2043/5833* (2013.01); *F15B 1/24* (2013.01); *F15B 2201/205* (2013.01); *F15B 2201/31* (2013.01); *F15B 2201/50* (2013.01); *F15B 2201/515* (2013.01)

(58) Field of Classification Search
CPC .................. B29B 7/56; B29B 7/722
See application file for complete search history.

(56) References Cited

U.S. PATENT DOCUMENTS

| | | | |
|---|---|---|---|
| 2014/0360360 A1 | 12/2014 | Bauer et al. | |
| 2016/0123356 A1 | 5/2016 | Jirgal et al. | |
| 2018/0345543 A1 | 12/2018 | Mizunuma et al. | |
| 2024/0191731 A1* | 6/2024 | Hart | A63G 7/00 |

FOREIGN PATENT DOCUMENTS

| | | | | |
|---|---|---|---|---|
| CN | 104024655 A | 9/2014 | | |
| DE | 102011007765 A1 | 10/2012 | | |
| DE | 102014105154 A1 * | 10/2015 | ............ | F15B 1/24 |
| DE | 102017002077 A1 * | 9/2018 | ............ | F16F 9/0218 |
| DE | 102020214621 A1 | 5/2022 | | |

* cited by examiner

*Primary Examiner* — Atul P. Khare
(74) *Attorney, Agent, or Firm* — LEYDIG, VOIT & MAYER, LTD.

(57) ABSTRACT

A rolling assembly, including at least one roll pair with two cooperating rolls and a safety device. The safety device includes a hydraulic accumulator and a measuring device. The hydraulic accumulator includes an accumulator with a first and second accumulator chamber. A hydraulic fluid is disposed within the first accumulator chamber. A compressible gas is disposed within the second accumulator chamber. The hydraulic accumulator includes a moveably arranged separating member separating the first accumulator chamber from the second accumulator chamber. The roll pair has a working position and a safety position. A radial distance between the rolls is larger in the safety position than in the working position. The hydraulic accumulator is configured to move the roll pair from the working position to the safety position. The measuring device is configured to continuously detect a position of the separating member within the hydraulic accumulator.

9 Claims, 2 Drawing Sheets

ROLLING ASSEMBLY

CROSS REFERENCE TO RELATED APPLICATIONS

This application claims benefit to German Patent Application No. DE 10 2023 110 088.2, filed on Apr. 20, 2023, which is hereby incorporated by reference herein.

FIELD

The invention relates to a rolling assembly. The invention also relates to a method of monitoring the functionality of a hydraulic accumulator of such a rolling assembly.

BACKGROUND

Rolling assemblies are generally known. A roll pair of the rolling assembly comprises at least two cooperating rolls, which are rotatably supported to process a raw material, such as an elastomeric material, such as natural rubber. The space between the rolls is adjusted by means of hydraulic cylinders and can be increased or reduced by adjusting the piston travel of the hydraulic cylinder. To adjust the hydraulic cylinders, hydraulic fluid is introduced into one side of the hydraulic cylinder and withdrawn from the other side. The pumping of the hydraulic fluid is performed by a pump, wherein the displacement volume of the pump is limited for cost reasons. By these means, however, the velocity with which the distance between the rolls can be adjusted by the displacement of hydraulic fluid by the pump, is limited to slow velocities. When the plant is shut down, for example to perform maintenance work, or when there is a malfunction, it is necessary, for safety reasons, to increase the space between rolls. In particular, in the case of an operational interruption by an emergency stop, it must be ensured that the cooperating rolls are adjusted to a predetermined minimum distance within a predetermined period of time. Mostly, the gap between the rolls must reach 50 mm within 5 seconds. This increases operational safety.

To achieve higher adjusting velocities, in particular, to increase the distance between the rolls in the case of an emergency stop, it has been known to arrange a hydraulic accumulator in the hydraulic system. In the case of an emergency stop, hydraulic fluid can be introduced into the hydraulic system and thus to the hydraulic cylinders within a short period of time to increase the distance between the rolls within a short period of time.

DE 10 2020 214 621 A1 discloses a rolling mill having a hydraulic axle. The hydraulic axle has at least one hydraulic cylinder to adjust a distance of two rolls of a rolling mill with respect to each other. The pressure of the hydraulic cylinder can be monitored by a pressure sensor. A hydraulic machine is provided to supply pressurized medium to the hydraulic cylinder.

SUMMARY

In an embodiment, the present disclosure provides a rolling assembly, comprising at least one roll pair with two cooperating rolls and a safety device. The safety device includes a hydraulic accumulator and a measuring device. The hydraulic accumulator includes an accumulator with a first accumulator chamber and a second accumulator chamber. A hydraulic fluid is disposed within the first accumulator chamber. A compressible gas is disposed within the second accumulator chamber. The hydraulic accumulator includes a moveably arranged separating member, which separates the first accumulator chamber from the second accumulator chamber in a manner sealed to the medium. The roll pair has a working position and a safety position. A radial distance between the rolls is larger in the safety position than in the working position. The hydraulic accumulator is configured to have an effect on the roll pair to move the roll pair from the working position to the safety position. The measuring device is configured to continuously detect a position of the separating member within the hydraulic accumulator.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
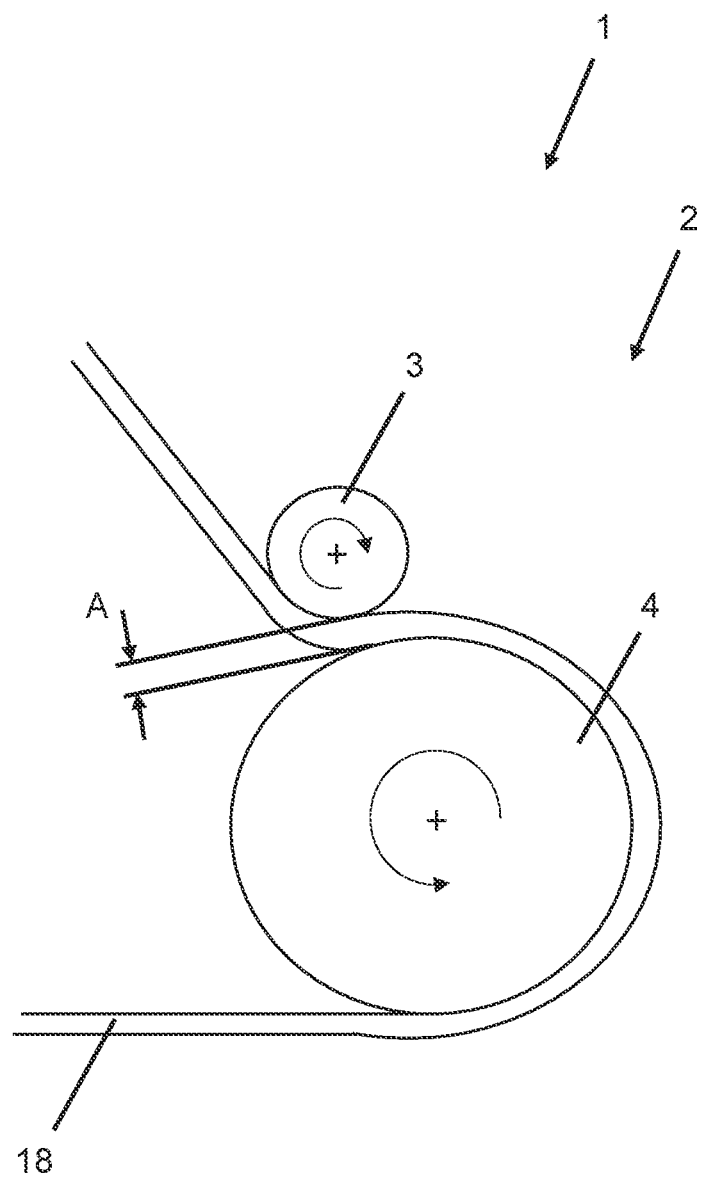
FIG. 1 schematically illustrates a roll pair of a rolling assembly.

In an embodiment, the invention provides a rolling assembly which enables improved operational safety.

The rolling assembly according to an embodiment of the invention comprises at least one roll pair with two cooperating rolls and a safety device, wherein the safety device includes a hydraulic accumulator and a measuring device, wherein the hydraulic accumulator includes an accumulator with a first accumulator chamber and a second accumulator chamber, wherein a hydraulic fluid is disposed within the first accumulator chamber, wherein a compressible gas is disposed within the second accumulator chamber, wherein the hydraulic accumulator includes a moveable separating member, which separates the first accumulator chamber from the second accumulator chamber in a manner sealed to the medium, wherein the roll pair has a working position and a safety position, wherein the radial distance between the rolls is larger in the safety position than in the working position, wherein the hydraulic accumulator is configured to have an effect on the roll pair to move the roll pair from the working position to the safety position, wherein the measuring device is configured to continuously detect a position of the separating member within the hydraulic accumulator.

The introduction of hydraulic fluid into the accumulator can cause energy to be transferred into the hydraulic accumulator. To do this, hydraulic fluid is introduced into the first accumulator chamber so that the moveably arranged separating member moves and the volume of the second accumulator chamber is reduced. Thereby, the compressible gas in the second accumulator chamber is compressed. The mechanical work performed by the introduction of the hydraulic fluid for moving the separating member, is stored within the compressed gas. Energy thus stored is ideally stored indefinitely and can be directly accessed when needed. The expansion of the compressed gas can be used to convert the energy stored in the compressed gas to mechanical energy to move the roll pair, in particular, from the working position into the safety position. This can be implemented, in particular, by a hydraulic cylinder which is fluidically connectable to the hydraulic accumulator.

Preferably, the distance between rolls in the working position is in the range between 1 mm and 20 mm, in particular in a range between 1.5 mm and 12 mm. Preferably, the distance between rolls in the safety position is at least 50 mm. A hydraulic drive can be used as a drive. For this purpose, the two rolls of the roll pair can be moveably arranged. It is also provided that only one roll (adjustable roll) is moveably arranged and the other roll (fixed roll) is fixed to be rotatable in the arrangement and thus not arranged to be radially moveable.

To ensure the movement from the working position to the safety position in the case of an emergency stop, the functionality of the hydraulic accumulator must be continuously monitored. It must be ensured continuously and free of interruption that the energy stored in the compressed gas is sufficient to perform the movement into the safety position. The safety position must be reached within a certain period of time. Preferably, the period of time is less than 5 seconds. By continuously determining the position of the separating member, the pressure inside the second accumulator chamber can be continuously detected, thus enabling the disposable energy to be continuously determined.

If an undesirable position of the separating member is determined, for example due to a leakage in the second accumulator chamber, the hydraulic accumulator can be directly brought back into a setpoint state by replenishing with compressed gas, in which the separating member assumes a setpoint position. It is advantageous, in particular, that the continuous position determination of the separating member enables the pressure of the compressed gas in the second accumulator chamber to be continuously determined. To prove the functionality of the hydraulic accumulator it is not necessary, in particular, to completely empty the accumulator chamber by traversing the separating member, to then detect the pressure within the second accumulator chamber. The apparatus according to an embodiment of the invention thus enables the cycle time and the amount of hydraulic fluid to be pumped—and thus the energy to be expended to fill the hydraulic accumulator—to be reduced. Moreover, it is possible to always continuously monitor the hydraulic accumulator.

After triggering an emergency stop, hydraulic fluid can be directly reintroduced into the first accumulator chamber again to regenerate the hydraulic accumulator and to provide the hydraulic energy necessary for the next emergency stop. The regeneration is monitored by detecting the position of the separating member.

The compressed gas can be nitrogen, in particular. Other gases and/or other gas mixtures can also be used.

The first accumulator chamber can be fluidically connected to a reservoir for hydraulic fluid via a first control valve. Preferably, a hydraulic machine can be used to introduce hydraulic fluid from the reservoir of hydraulic fluid into the first accumulator chamber. In particular, the hydraulic machine can be a hydraulic pump or a hydraulic motor. The hydraulic machine is for supplying the first accumulator chamber with hydraulic fluid.

The second accumulator chamber can be fluidically connected to a reservoir of compressible gas via a second control valve. This enables the second accumulator chamber to be filled or refilled with compressible gas, in particular in the case of leakages or other losses of compressible gas.

The measuring device can be configured as a mechanical position sensing system. It is also provided that the measuring device is configured as a magnetic, electric, or optical position sensing system. The measuring device can be, in particular, a draw-wire encoder. Preferably, the measuring device is configured as a contactless position sensing system.

The hydraulic accumulator can be configured to be a piston accumulator, wherein the separating member is configured as a piston. A piston accumulator has a cylindrical configuration, wherein the length and diameter can be predetermined. This allows a piston accumulator to be particularly easily fitted into available structural spaces.

The hydraulic accumulator can be configured to be a bladder accumulator, wherein the separating member is configured as a bladder. Preferably, the bladder is made of plastic material, in particular, of an elastomer. A bladder accumulator is preferably configured to be spherical, which results in an advantageous ratio between the required structural space and performance.

The hydraulic accumulator can be configured to be a diaphragm accumulator, wherein the separating member is configured as a diaphragm. A diaphragm accumulator is preferably configured to be spherical, which results in an advantageous ratio between the required structural space and performance.

The first accumulator chamber can have an outlet valve associated with it, wherein the outlet valve is switchable between open and closed positions. In the closed position of the outlet valve, the first accumulator chamber is sealed to be fluid-tight. In the open position of the outlet valve, the hydraulic fluid can flow from the accumulator chamber through the outlet valve. The first accumulator chamber can be in operative connection with a movement apparatus via the outlet valve, wherein the movement apparatus is configured to have an effect on the roll pair so that at least one of the rolls of the roll pair is moved.

The rolling assembly can be configured as a rolling assembly for processing elastomeric materials. The rolling assembly can be configured to process, in particular, raw rubber, natural rubber, rubber or rubber mixtures.

An embodiment of invention is moreover based on providing a method of monitoring the functionality of a hydraulic accumulator of a rolling assembly with improved operational safety.

This is achieved by a method of monitoring the functionality of a safety device of an above-described rolling assembly, wherein the separating member is moved by changing the relative pressure between the first and second accumulator chambers, characterized in that the position of the separating member within the hydraulic accumulator is measured and is compared to a predetermined reference position of the separating member, wherein the functionality of the safety device is determinable from a deviation of the measured position from the predetermined reference position.

The relative pressure between the first and second accumulator chambers can be changed by introducing hydraulic fluid into the first accumulator chamber. It is also provided to drain hydraulic fluid from the first accumulator chamber to change the relative pressure. A deviation of the position of the separating member from the reference position means that the volume of the second accumulator chamber deviates from the volume which the second accumulator chamber occupies when the separating member is in the reference position. The energy stored in the compressible gas thus deviates in comparison with the energy stored in the compressible gas when the separating member is in the reference position.

When the deviation between the measured position and the predetermined reference position of the separating member exceeds a predetermined limit value, the energy stored in the compressed gas is insufficient to move the roll pair from the working position to the safety position. The functionality of the safety device is no longer ensured in this case. To reestablish the functionality, hydraulic fluid can be introduced into the first accumulator chamber to apply more energy to the compressible gas. This will change the position of the separating member so that comparing the measured position to the predetermined position can help to determine when the functionality is ensured.

The reference position can be determined during normal operation. The reference position is determined as a position of the separating member in which sufficient energy is stored in the hydraulic accumulator to move the roll pair from the working position to the safety position. Alternatively, it is also provided that the reference position is computed from data such as the geometric values of the rolling assembly (for example the dimensions of the first and second accumulator chambers) and the ideal gas law.

The position can be continuously compared to the reference position. This can be used to continuously determine whether the safety device is functional. A faster reaction to abrupt, but also creeping, changes in the stored energy is possible to restore functionality.

In an embodiment of the invention, a method is provided for a safety shutdown of an above-described rolling assembly, wherein at least sufficient energy is stored in the hydraulic accumulator to move the roll pair from the working position to the safety position, wherein the outlet valve is switched to the open position when the safety shutdown is activated, so that hydraulic fluid flows from the first accumulator chamber, wherein the compressible gas expands in the second accumulator chamber, whereby stored energy is released, whereby the roll pair is moved from the working position to the safety position.

Figure 2:
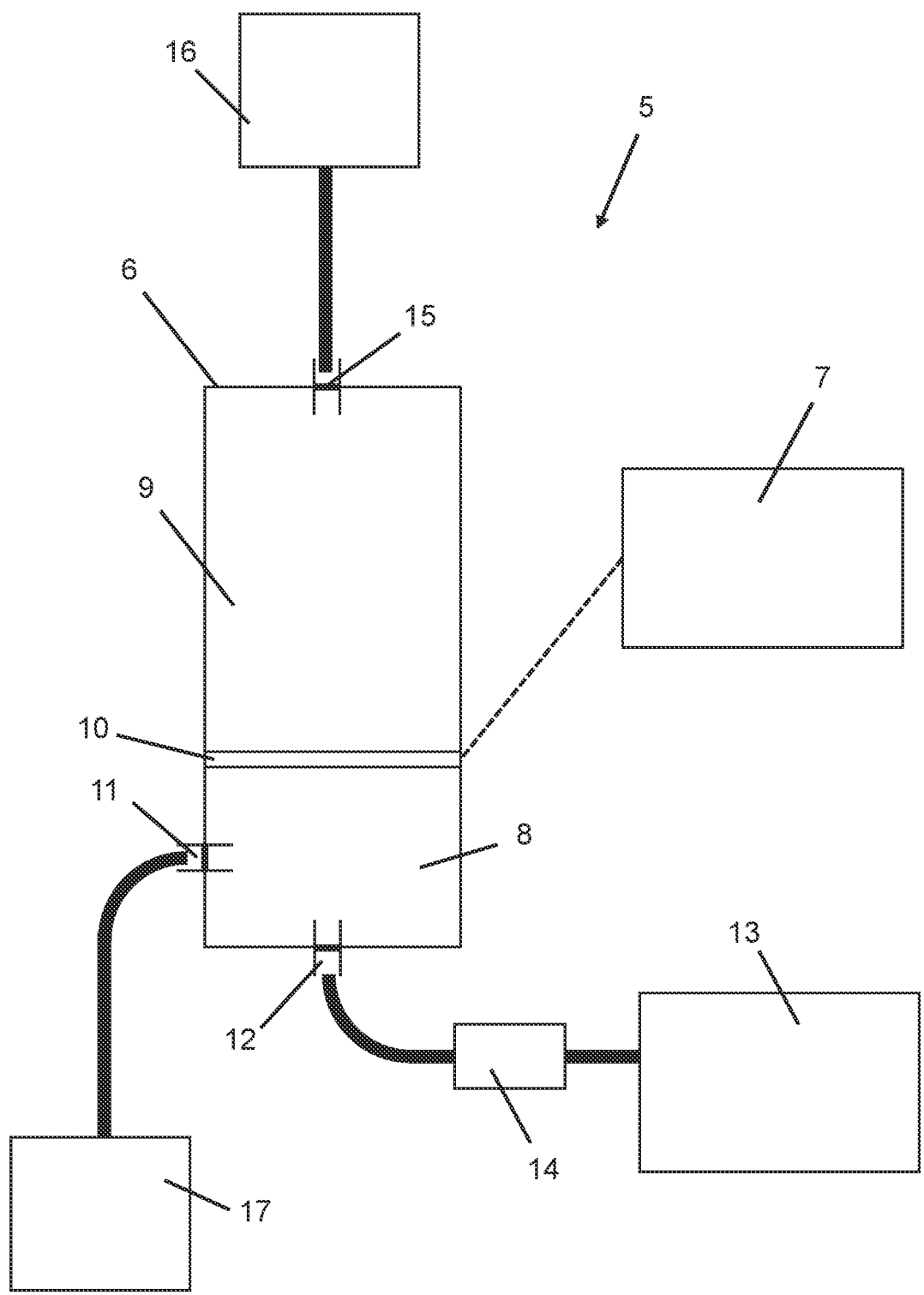
FIG. 2 schematically illustrates a safety device of the rolling assembly of FIG. 1.

FIGS. 1 and 2 show a rolling assembly 1. The rolling assembly 1 comprises a roll pair 2 with two cooperating rolls 3, 4, and a safety device 5.

The distance A between the rolls 3, 4 is adjusted by means of two hydraulic cylinders 17 and can be made larger or smaller by adjusting the piston travel of the hydraulic cylinder 17. To adjust the hydraulic cylinder 17, hydraulic fluid is introduced to one side of the hydraulic cylinder 17 and is removed from the other side. Pumping of the hydraulic fluid is performed by a hydraulic pump.

FIG. 1 shows the roll pair 2 of the rolling assembly 1 with two cooperating rolls 3, 4. The roll pair 2 has a working position and a safety position, wherein the radial distance A between the rolls 3, 4 is larger in the safety position than in the working position. FIG. 1 shows the roll pair in the working position.

The rolling assembly 1 is configured as a rolling assembly 1 for the processing of elastomeric materials. The rolling assembly is for processing an elastomeric material 18 which is configured as a web material.

FIG. 2 shows the safety device 5 of the rolling assembly 1. The safety device 5 includes a hydraulic accumulator 6 and a measuring device 7. The hydraulic accumulator 6 includes an accumulator with a first accumulator chamber 8 and a second accumulator chamber 9. A hydraulic fluid is arranged in the first accumulator chamber 8, wherein a compressible gas is arranged in the second accumulator chamber 9. The compressible gas can be nitrogen, in particular. Furthermore, the hydraulic accumulator 6 comprises a moveably arranged separating member 10 which separates the first accumulator chamber 8 from the second accumulator chamber 9 in a manner sealed to media. The hydraulic accumulator 6 is configured to have an effect on the roll pair 2 to move the roll pair 2 from the working position to the safety position. The measuring device 7 is configured to continuously detect a position of the separating member 10 within the hydraulic accumulator 6.

The first accumulator chamber 8 can be fluidically connected to a reservoir for hydraulic fluid 13 via a first control valve 12. The first control valve 12 is closed in the state shown. When the first control valve 12 is open, hydraulic fluid from the reservoir for hydraulic fluid 13 can be introduced into the first accumulator chamber by means of a hydraulic machine 14. The hydraulic machine 14 is a hydraulic pump. The hydraulic machine 14 is for supplying hydraulic fluid to the first accumulator chamber.

The second accumulator chamber 9 can be fluidically connected to a reservoir for compressible gas 16 via a second control valve 15. This enables the second accumulator chamber 9 to be filled or refilled with compressible gas, in particular in the case of leakages or other losses of compressible gas. The second control valve 15 is closed in the state shown.

The measuring device 7 is configured to be a mechanical position sensing system. The measuring device can also be configured as a magnetic, electric or optical position sensing system.

The hydraulic accumulator 6 is configured to be a piston accumulator. The separating member 10 is configured as a piston. The hydraulic accumulator 6 formed as a piston accumulator has a cylindrical configuration. The hydraulic accumulator 6 can be formed as a bladder accumulator or as a diaphragm accumulator.

The first accumulator chamber 8 has an outlet valve 11 associated with it, wherein the outlet valve 11 is switchable between open and closed positions. In the closed position shown of the outlet valve 11, the first accumulator chamber 8 is closed off in a fluid-tight manner. In the open position of the outlet valve, the hydraulic fluid can flow out of the first accumulator chamber 8 through the outlet valve 11. The first accumulator chamber 8 is operatively connected, via the outlet valve 11, to a movement apparatus in the form of a hydraulic cylinder 17. The hydraulic cylinder 17 is configured to have an effect on the roll pair 2 to move at least one of the rolls 3, 4 of the roll pair 2.

The separating member 2 is moved by changing the relative pressure between the first and second accumulator chambers 8, 9. The measuring device 7 measures the position of the separating member 10 within the hydraulic accumulator 6 and compares it to a predetermined reference position of the separating member 10. A deviation of the measured position from the predetermined reference position allows the functionality of the safety device 5 to be determined. The reference position is determined during normal operation. Herein, the reference position is determined as a position of the separating member 10 in which sufficient energy is stored in the hydraulic accumulator 6 to move the roll pair 2 from the working position to the safety position. Alternatively, it is also provided that the reference position is computed from data, such as the geometric values of the rolling assembly 1 (for example the dimensions of the first and second accumulator chambers 8, 9) and the ideal gas law.

The position of the separating member 10 is continuously compared to the reference position. This allows a continuous determination of whether the safety device 5 is functional.

The safety device 5 is functional when sufficient energy is stored in the hydraulic accumulator 6 to move the roll pair 2 from the working position to the safety position. When a safety shutdown is activated, the outlet valve 11 is switched to the open position so that hydraulic fluid flows from the first accumulator chamber 8. This allows the compressible gas in the second accumulator chamber 9 to expand and to release stored energy, whereby the roll pair 2 is moved from the working position to the safety position.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for monitoring functionality of a safety device of a rolling assembly, the rolling assembly comprising:
   at least one roll pair with two cooperating rolls; and
   the safety device,
   wherein the safety device includes a hydraulic accumulator and a measuring device,
   wherein the hydraulic accumulator includes an accumulator with a first accumulator chamber and a second accumulator chamber,
   wherein a hydraulic fluid is disposed within the first accumulator chamber,
   wherein a compressible gas is disposed within the second accumulator chamber,
   wherein the hydraulic accumulator includes a moveably arranged separating member, which separates the first accumulator chamber from the second accumulator chamber in a sealed manner,
   wherein the roll pair has a working position and a safety position, wherein a radial distance between the rolls is larger in the safety position than in the working position,
   wherein the hydraulic accumulator is configured to have an effect on the roll pair to move the roll pair from the working position to the safety position, and
   wherein the measuring device is configured to continuously detect a position of the separating member within the hydraulic accumulator,
   wherein the method comprises:
   moving the separating member by changing a relative pressure between the first and second accumulator chambers;
   measuring a position of the separating member within the hydraulic accumulator and comparing the measured position of the separating member to a predetermined reference position of the separating member; and
   determining the functionality of the safety device from a deviation of the measured position from the predetermined reference position.

2. The method according to claim 1, wherein the measuring device is a mechanical position sensing system.

3. The method according to claim 1, wherein the hydraulic accumulator is a piston accumulator, and wherein the separating member is formed as a piston.

4. The method according to claim 1, wherein the hydraulic accumulator is a bladder accumulator, and wherein the separating member is formed as a bladder.

5. The method according to claim 1, wherein the hydraulic accumulator is a diaphragm accumulator, and wherein the separating member is formed as a diaphragm.

6. The method according to claim 1, wherein the first accumulator chamber has an outlet valve associated therewith, and wherein the outlet valve is switchable between open and closed positions.

7. The method according to claim 1, wherein the rolling assembly is configured to process elastomeric materials.

8. The method according to claim 1, wherein the reference position is determined during normal operation of the rolling assembly.

9. The method according to claim 1, wherein the measured position is continuously compared to the reference position.

* * * * *